(12) United States Patent
DaCosta

(10) Patent No.: US 9,318,121 B2
(45) Date of Patent: Apr. 19, 2016

(54) METHOD AND SYSTEM FOR PROCESSING AUDIO DATA OF VIDEO CONTENT

(71) Applicant: SONY CORPORATION, Tokyo (JP)

(72) Inventor: Behram Mario DaCosta, San Jose, CA (US)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/628,432

(22) Filed: Feb. 23, 2015

(65) Prior Publication Data

US 2015/0302863 A1 Oct. 22, 2015

Related U.S. Application Data

(60) Provisional application No. 61/982,126, filed on Apr. 21, 2014.

(51) Int. Cl.
*H04N 7/14* (2006.01)
*G10L 21/0208* (2013.01)
*H04N 7/15* (2006.01)

(52) U.S. Cl.
CPC .............. *G10L 21/0208* (2013.01); *H04N 7/15* (2013.01); *G10L 2021/02087* (2013.01)

(58) Field of Classification Search
CPC ......................................................... H04N 7/14
USPC .................. 348/14.01, 14.03, 14.12
See application file for complete search history.

(56) References Cited

U.S. PATENT DOCUMENTS

| | | | |
|---|---|---|---|
| 5,084,768 A | 1/1992 | Stern et al. | |
| 7,783,061 B2 | 8/2010 | Zalewski et al. | |
| 7,843,486 B1 * | 11/2010 | Blair | H04M 3/568 348/14.01 |
| 8,462,190 B2 * | 6/2013 | Togami | G10L 21/00 348/14.01 |
| 8,509,454 B2 | 8/2013 | Kirkeby et al. | |
| 8,681,203 B1 * | 3/2014 | Yin | H04N 7/15 348/14.08 |
| 2008/0062252 A1 * | 3/2008 | Kawamura | H04N 7/152 348/14.09 |
| 2008/0130908 A1 | 6/2008 | Cohen et al. | |
| 2009/0086013 A1 * | 4/2009 | Thapa | H04N 7/15 348/14.08 |
| 2012/0098921 A1 * | 4/2012 | Stedman | H04M 3/567 348/14.08 |
| 2013/0259312 A1 | 10/2013 | Lyons et al. | |
| 2014/0184726 A1 * | 7/2014 | Kim | H04N 7/147 348/14.07 |
| 2014/0185785 A1 * | 7/2014 | Bouknight, Jr. | H04M 3/56 379/202.01 |
| 2015/0179186 A1 * | 6/2015 | Swierk | G10L 25/60 704/276 |

OTHER PUBLICATIONS

Apple Inc., "IMovie '11: Adjust the Volume of a Portion of an Audio or a Video Clip", Jul. 23, 2012, "http://support.apple.com/kb/ph2268".
Gary Rebholz, "10 Editing Tips to Help You Work Faster in Sound Forge Pro", Feb. 4, 2010, "http://www.sonycreativesoftware.com/10_ways_to_work_faster_in_sound_forge_pro".
AVS4YOU, "How to Increase the Sound Volume of (a Part of) an Audio Track?", Dec. 19, 2013, "http://www.ays4you.com/guides/How-to-amplify-sound-with-Audio-Editor.aspx".
Audacityteam, "Selecting Audio", Aug. 11, 2012, "http://manual.audacityteam.org/o/man/audacity_selection.html".

* cited by examiner

*Primary Examiner* — Olisa Anwah
(74) *Attorney, Agent, or Firm* — Sony Corporation

(57) ABSTRACT

Various aspects of a method and system to process audio data are disclosed herein. In accordance with an embodiment, the method includes identification of a source-of-interest (SOI), via a user interface (UI), when video content is played back. The SOI is identified based on one or more parameters. An audio portion of the identified SOI is selectively enhanced when the video content is played back.

20 Claims, 7 Drawing Sheets

METHOD AND SYSTEM FOR PROCESSING AUDIO DATA OF VIDEO CONTENT

CROSS-REFERENCE TO RELATED APPLICATIONS/INCORPORATION BY REFERENCE

This application makes reference to, claims priority to, and claims the benefit of U.S. Provisional Application Ser. No. 61/982,126 filed on Apr. 21, 2014. The above referenced application is hereby incorporated herein by reference in its entirety.

FIELD

Various embodiments of the disclosure relate to processing audio data of video content. More specifically, various embodiments of the disclosure relate to processing audio data of video content for selective enhancement of an audio portion.

BACKGROUND

Advancements in the field of audio processing have introduced various revolutionary functionalities to new generation electronic devices, such as a digital camera or a smartphone. Consequently, such new generation electronic devices may be configured to perform several signal-processing techniques simultaneously when an event is recorded. One such signal-processing technique may be an audio beamforming technique, which may be utilized to determine the direction of audio signals when the event is recorded.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and system to process audio data of video content substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
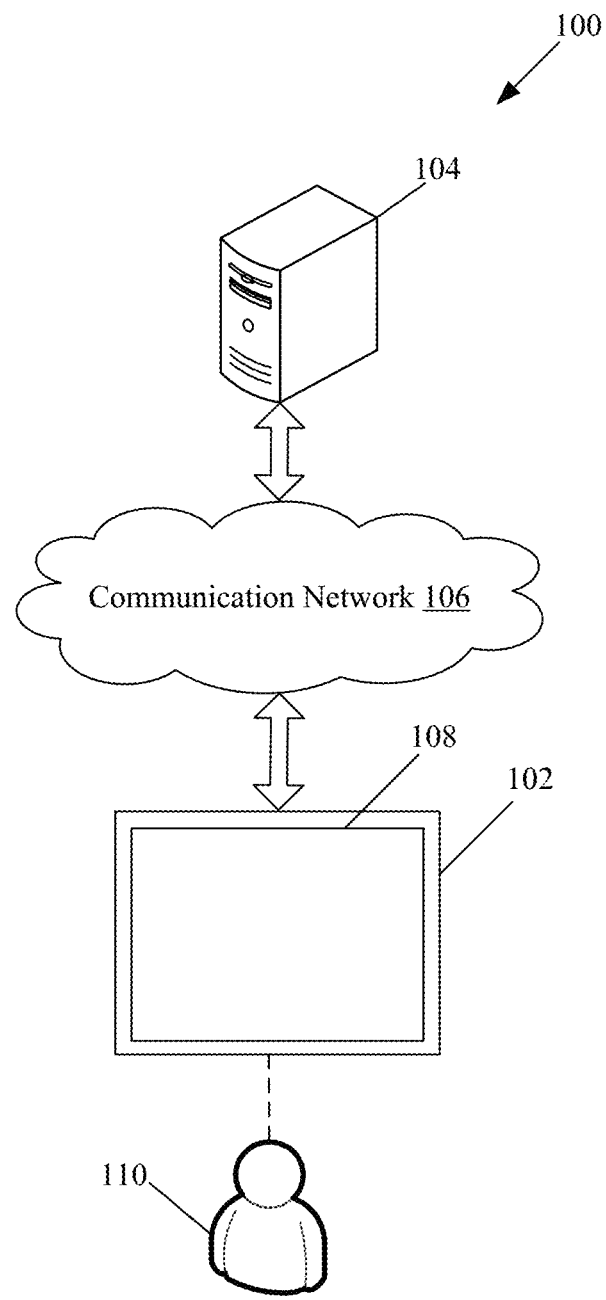
FIG. 1 is a block diagram that illustrates a network environment to process audio data of video content, in accordance with an embodiment of the disclosure.

In certain scenarios, when an event, such as a business conference, is recorded by a digital camera, the associated audio content may not be optimal. In such scenarios, desired audio from a specific source-of-interest (SOI) may not be discernible due to concurrent background conversations, environmental sounds, and/or other ambient noises. To resolve such discrimination issues, an array of directional microphones may be used to implement audio beamforming techniques. By use of such an array of directional microphones, it may be possible to receive audio signals from a specific direction. However, manual adjustment of the directional microphones (towards the audio SOD may be required to be performed when the event is recorded. Thus, it may be cumbersome for the user to handle such electronic devices with an array of bulky directional microphones. Further, once the directional microphones are adjusted, manually or automatically, in the specific direction during event recording, audio portion that correspond to other audio signals from other directions may not be recorded. Thus, the audio portions that correspond to other audio signals from other directions may not be played back at later time.

Various implementations may be found in a method and/or a system to process audio data of video content. Exemplary aspects of the disclosure may comprise a method implemented in an electronic device to process audio data of video content. A source-of-interest (SOI) may be identified via a user interface (UI), during a playback of the video content. The SOI may be identified based on one or more parameters. In accordance with an embodiment, an audio portion of the identified SOI may be selectively enhanced during the playback of the video content. The one or more parameters may correspond to one or more of a selection of the SOI based on a touch input on the SOI displayed on a display screen that displays the video content, selection of a displayed waveform that corresponds to audio portion of the SOI, a button-press event performed when the audio portion is to be recorded for the SOI, selection of the SOI based on tracking eye movements of a user, and/or an automatic selection of the SOI based on previously stored spatio-temporal signature of the SOI.

In accordance with an embodiment, audio data of the video content may be received via one or more microphones. The audio data may comprise audio portion of the identified SOI and background audio portion. The background audio portion may comprise ambient noise and other audio portions of remaining SOIs. In accordance with an embodiment, the background audio portion of the audio data may be suppressed when the audio portion of the identified SOI may be selectively enhanced.

In accordance with an embodiment, audio data decomposition of the audio data into a plurality of signal components may be performed based on one or more of a signal frequency, a signal amplitude, a signal phase, and/or a signal modulation rate, performed over one or more time intervals. In accordance with an embodiment, a set of signal components may be extracted from the plurality of signal components based on a threshold value. In accordance with an embodiment, one or more groups of signal components from the extracted set of signal components may be determined based on a coherency factor.

In accordance with an embodiment, signal separation may be performed to select a group of signal components, associated with the identified SOI, from the determined one or more groups of signal components based on one or more criteria. The one or more criteria may comprise one or more of signal strength of the audio portion of the identified SOI, a signal direction of the audio portion of the identified SOI, hardware configuration of the electronic device, and/or one or more user preferences. The selected group of signal components may be reconstituted to determine the audio portion associated with the identified SOI.

In accordance with an embodiment, the audio portion of the identified SOI may correspond to a signal-to-noise (SNR) ratio. The SNR ratio may be higher than a pre-determined threshold value. In accordance with an embodiment, the selective enhancement of the audio portion of the identified SOI may be direction independent. In accordance with an embodiment, another SOI may be identified, via the UI, during the video playback based on the one or more parameters. Another audio portion of the identified other SOI may be selectively enhanced during the video playback. In accordance with an embodiment, the audio portion of the identified SOI may be selectively enhanced when the video content may be received and/or recorded. In accordance with an embodiment, a correlation of the audio portion from audio data associated with the video content and the identified SOI may be estimated based on a spatio-temporal audio pattern matching technique.

FIG. 1 is a block diagram that illustrates a network environment that processes audio data of video content, in accordance with an embodiment of the disclosure. With reference to FIG. 1, there is shown a network environment 100. The network environment 100 may include an electronic device 102, a multimedia server 104, and a communication network 106. The electronic device 102 may include a display screen 108. The electronic device 102 may be associated with one or more users, such as a user 110 (not shown). The electronic device 102 may be communicatively coupled to the multimedia server 104, via the communication network 106.

The electronic device 102 may comprise suitable logic, circuitry, interfaces, and/or code that may be operable to capture the real-time field-of-view (FOV) of a live event. The electronic device 102 may be further operable to receive video content from the multimedia server 104, via the communication network 106. The electronic device 102 may be further operable to process the real-time FOV and/or the received video content. The electronic device 102 may be further operable to record the captured real-time FOV of the live event. The electronic device 102 may be further operable to receive one or more preferences from the user 110. Examples of the electronic device 102 may include a camcorder, a digital camera, a television, an Internet Protocol Television (IPTV), a laptop, a tablet computer, a smartphone, a personal digital assistant (PDA) device, and/or other such electronic device that includes the display screen 108.

The multimedia server 104 may comprise suitable logic, circuitry, interfaces, and/or code that may be operable to host the video content. The multimedia server 104 may be communicatively coupled with a remote video-capturing device (not shown). The remote video-capturing device may be configured to capture video content and transmit the captured video content to the multimedia server 104. The multimedia server 104 may be implemented using several technologies well known to those skilled in the art. Examples of the multimedia server 104 may include, but are not limited to, Apache™ HTTP Server, Microsoft® Internet Information Services (IIS), IBM® Application Server, and/or Sun Java™ System Web Server.

The communication network 106 may include a medium through which the electronic device 102 may communicate with one or more servers, such as the multimedia server 104. Examples of the communication network 106 may include, but are not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be operable to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The display screen 108 may comprise suitable logic, circuitry, interfaces, and/or code that may be operable to render the real-time FOV captured by the electronic device 102. The display screen 108 may be further operable to render the video content received from the multimedia server 104. The display screen 108 may be further operable to render one or more features that may correspond to an application downloaded from an application server (not shown). The display screen 108 may be further operable to receive one or more preferences from the user 110. The display screen 108 may be realized through several known technologies that may include, but are not limited to, Liquid Crystal Display (LCD) display, Light Emitting Diode (LED) display, and/or Organic LED (OLED) display technology.

In operation, the electronic device 102 may be operable to transmit a request, via the communication network 106, to the multimedia server 104 for video content. In accordance with an embodiment, the video content may be pre-stored at the multimedia server 104. In accordance with an embodiment, the multimedia server 104 may receive the requested video content from the remote video-capturing device. The multimedia server 104 may store the received video content. In response to the received request, the multimedia server 104 may transmit the requested video content to the electronic device 102. In accordance with an embodiment, the multimedia server 104 may stream live video content to the electronic device 102. In accordance with an embodiment, the video content may be pre-stored in a local memory of the electronic device 102. The video content may comprise video data and audio data. The video data of the received video content may be rendered at the display screen 108. The audio data of the received video content may be played by an output device, such as one or more speakers, associated with the electronic device 102.

In accordance with an embodiment, the electronic device 102 may capture real-time FOV of a live event. Examples of the live event may include, but are not limited to, a sports event, a press-conference, a live chat-show, and/or an open-hall discussion. The captured, real-time FOV may be simultaneously displayed at the display screen 108. In such a case, the electronic device 102 may include an input device, such as one or more microphones, to receive audio data associated with the captured real-time FOV.

In accordance with an embodiment, the video data that corresponds to the received video content (or the captured real-time FOV) may comprise a plurality of sources-of-interest (SOIs). The plurality of SOIs in the video data (or the captured real-time FOV) may be rendered at the display screen 108. The rendered plurality of SOIs may be viewed by the user 110. Each of the plurality of SOIs may be associated with a plurality of audio portions. The audio data, associated with the video data, may include the plurality of audio portions and ambient noise. The plurality of audio portions and ambient noise may be overlapped with respect to each other during different time intervals. The audio data may comprise a plurality of signal components. Each of the plurality of signal components may be associated with a signal frequency, signal amplitude, a signal phase, and/or a signal modulation rate, performed over one or more time intervals.

In accordance with an embodiment, the display screen 108 may be operable to receive one or more preferences from the user 110. In accordance with an embodiment, the one or more preferences may comprise a timestamp to select a desired video clip from the video content. The one or more preferences may further comprise a clip-duration to select the desired video clip from the video content.

In accordance with an embodiment, the user 110 may perform a selection of an SOI from the plurality of SOIs rendered on the display screen 108. The plurality of SOIs may correspond to the captured real-time FOV, the recorded video content, and/or the video content received from the multimedia server 104. In accordance with an embodiment, the user 110 may perform a selection of the desired SOI when the recorded video content is played back by the electronic device 102. The selection of the SOI may be performed via one or more parameters provided by the user 110. The one or more parameters may comprise a touch input that may be provided by the user 110 to select the SOI. The touch input may be provided by the user 110, via the display screen 108. The one or more parameters may further comprise a selection of a waveform displayed at the display screen 108. The waveform may correspond to an audio portion that may be associated with the SOI that the user 110 desires to listen to. The one or more parameters may further comprise a button-press event performed by the user 110. The button-press event may be performed when the audio portion for the desired SOI is recorded. The one or more parameters may further comprise a gaze direction that corresponds to the eye-movement of the user 110. The one or more parameters may further comprise an automatic selection of the SOI, based on previously stored spatio-temporal signature of the SOI. The electronic device 102 may be operable to identify the SOI, based on the selection performed by the user 110.

In accordance with an embodiment, the electronic device 102 may be operable to perform audio data decomposition to determine the plurality of signal components. The audio data decomposition may be based on one of a signal frequency, signal amplitude, signal phase, and/or a signal modulation rate, performed over one or more time intervals. In accordance with an embodiment, the electronic device 102 may be operable to extract a set of signal components from the plurality of signal components based on a threshold value. In accordance with an exemplary scenario, the audio portion of the identified SOI may be associated with a signal-to-noise (SNR) ratio. The SNR ratio of the audio portion of the identified SOI may be higher than a threshold value that may correspond to a minimum acceptable SNR ratio. In accordance with another exemplary scenario, the audio portion of the identified SOI may correspond to an associated signal frequency. The signal frequency of the audio portion of the identified SOI may be greater than a pre-determined resolution value.

In accordance with an embodiment, the threshold value may be manually provided as one of the one or more user preferences by the user 110. In accordance with an embodiment, the threshold value may be automatically determined by the electronic device 102, based on the hardware configuration of the electronic device 102.

In accordance with an embodiment, the electronic device 102 may be operable to determine one or more groups from the extracted set of signal components, based on a coherency factor. The coherency factor may correspond to a degree of similarity of the two or more signal components from the extracted set of signal components. Each determined group may correspond to an audio portion of a corresponding SOI in the audio data.

In accordance with an embodiment, the electronic device 102 may be operable to perform signal separation on the determined one or more groups of signal components. The signal separation may be performed to select a group of signal components from the determined one or more groups of signal components based on one or more criteria. The one or more criteria may comprise one or more of signal strength of the audio portion of the identified SOI, signal direction of the audio portion of the identified SOI, hardware configuration of the electronic device, and/or one or more user preferences. The selected group of signal components may correspond to the audio portion of the identified SOI. In accordance with an embodiment, the electronic device 102 may be operable to reconstitute the selected group of signal components to determine the audio portion that corresponds to the identified SOI.

In accordance with an embodiment, the determined audio portion of the identified SOI may be selectively enhanced when the real-time FOV is captured, the captured real-time FOV is recorded, and/or the recorded video content is played back. In accordance with an embodiment, the audio portions of the remaining SOIs may be suppressed when the real-time FOV is captured, the captured real-time FOV is recorded, and/or the recorded video content is played back. In accordance with an embodiment, the audio portion of the identified SOI may be enhanced and the other audio portions of the remaining SOIs may be suppressed when the real-time FOV is captured, the captured real-time FOV is recorded, and/or the recorded video content is played back.

In accordance with an embodiment, the user 110 may select another SOI, via the display screen 108, when the video content is played back. The selection may be performed based on the one or more parameters. Based on the selection, the electronic device 102 may be operable to identify the other SOI. In accordance with an embodiment, another audio portion that corresponds to the other identified SOI may be selectively enhanced when the video content is received, recorded, and/or played back. In accordance with an embodiment, the other audio portions of the remaining SOIs may be suppressed when the video content is received, recorded, and/or played back. In accordance with an embodiment, the other audio portion of the other SOI may be enhanced and rest of the audio portions of the remaining SOIs may be suppressed when the video content is received, recorded, and/or played back.

Figure 2:
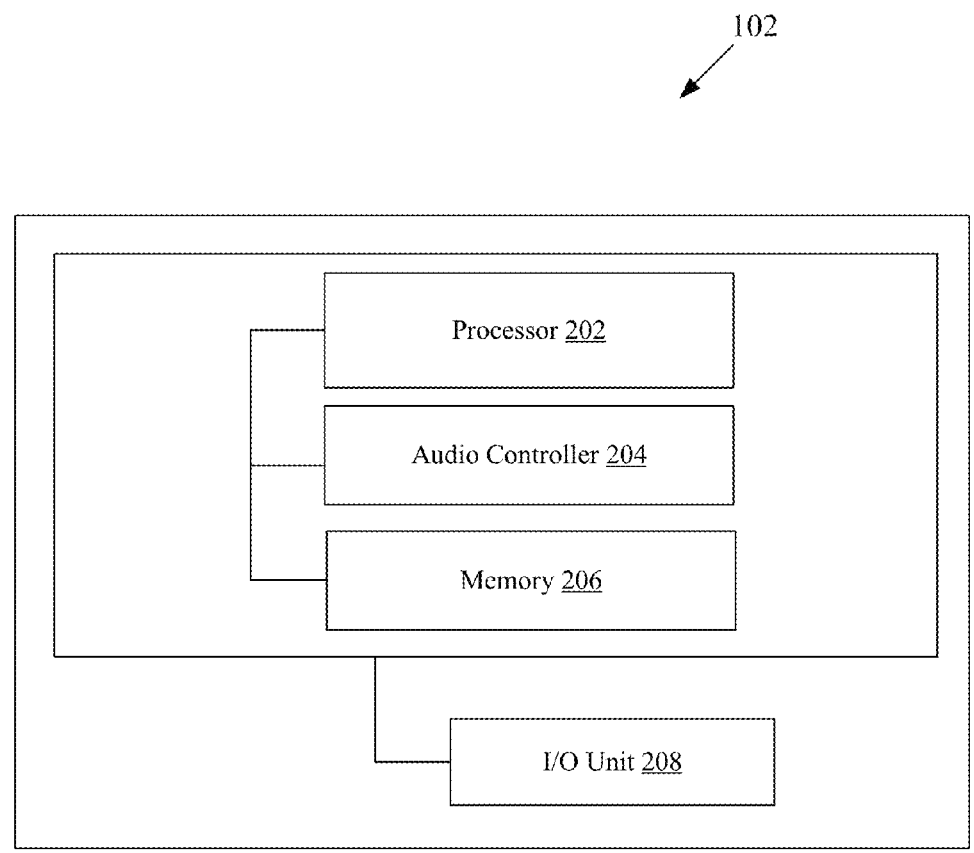
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may comprise one or more processors, such as a processor 202 and an audio controller 204. The electronic device 102 may further comprise a memory 206 and one or more input/output (I/O) devices, such as an I/O unit 208. The I/O unit 208 may comprise the display screen 108 (as shown in FIG. 1). The processor 202 may be communicatively coupled to the audio controller 204, the memory 206, and the I/O unit 208. In accordance with an embodiment, the electronic device 102 may further include a transceiver (not shown). The transceiver may be operable to communicate with one or more servers, such as the multimedia server 104 (as shown in FIG. 1), via the communication network 106 (as shown in FIG. 1). In such a case, the transceiver may be communicatively coupled to the one or more processors, such as the processor 202, and the audio controller 204.

The processor 202 may comprise suitable logic, circuitry, interfaces, and/or code that may be operable to execute a set of instructions stored in the memory 206. The processor 202 may be operable to receive video content from the multimedia server 104, via the transceiver. The processor 202 may be further operable to record a captured, real-time FOV of a live event. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The audio controller 204 may comprise suitable logic, circuitry, interfaces, and/or code that may be operable to analyze and process the audio data, based on one or more signal-processing algorithms received from the memory 206. The one or more signal-processing algorithms may correspond to a beamforming algorithm, spatio-temporal audio processing algorithms, and/or the like.

The memory 206 may comprise suitable logic, circuitry, and/or interfaces that may be operable to store a machine code and/or a computer program with at least one code section executable by the processor 202, and/or the audio controller 204. The memory 206 may be further operable to store one or more preferences provided by the user 110. The memory 206 may be further operable to store one or more signal-processing algorithms. Examples of implementation of the memory 206 may include, but are not limited to, Random Access Memory (RAM), Read Only Memory (ROM), Hard Disk Drive (HDD), and/or a Secure Digital (SD) card.

The I/O unit 208 may comprise suitable logic, circuitry, interfaces, and/or code that may be operable to receive one or more preferences from the user 110, or provide an output to the user 110. The I/O unit 208 may comprise various input and output devices that may be operable to communicate with the processor 202. Examples of the input devices may include, but are not limited to, one or more microphones, a touch screen, an input port, a motion sensor, a light sensor, and/or a docking station. Examples of the output devices may include, but are not limited to, a display screen 108 and/or one or more speakers.

In operation, the processor 202 may be operable to request the video content from the multimedia server 104. Based on the request, the multimedia server 104 may retrieve the requested video content from the local memory (not shown). In accordance with an embodiment, the multimedia server 104 may receive the requested video content from a remote video-capturing device (not shown). The multimedia server 104 may store the received video content in the local memory. The multimedia server 104 may transmit the stored video content to the transceiver of the electronic device, via the communication network 106. The transceiver may be operable to receive the video content and communicate the received video content to the processor 202. In accordance with an embodiment, the multimedia server 104 may stream live video content to the electronic device 102.

In accordance with an embodiment, the video content may comprise video data and audio data. The video data of the received video content may be displayed on a user interface (UI) rendered at the display screen 108. The received video content may comprise a plurality of SOIs. Each of the plurality of SOIs may correspond to an associated audio portion in the audio data. The audio data of the received video content may comprise the plurality of audio portions associated with the plurality of SOIs and/or ambient noise. The audio data may be a mono-signal audio data or a stereo-signal audio data. The audio data may be played by an output device, such as one or more speakers, of the I/O unit 208.

In accordance with an embodiment, optical components of the electronic device 102, such as a set of image-capturing sensors, may be operable to capture the real-time FOV of a live event, such as a press-conference. The captured, real-time FOV may be simultaneously displayed at the display screen 108. In such a case, the video data may correspond to the real-time FOV of the live event, captured via the optical components. The captured, real-time FOV may comprise a plurality of SOIs. The plurality of SOIs may be viewed by the user 110 when the captured, real-time FOV is rendered at the display screen 108. Each of the plurality of SOIs may correspond to an associated audio portion. The audio data, associated with the video data, may include a plurality of audio portions and ambient noise. The plurality of audio portions and the ambient noise may overlap with respect to each other during different time intervals. During such time intervals, the audio portions may not be discernable to the user 110 due to such overlapping. The input devices of the I/O unit 208, such as one or more microphones, may be operable to receive the audio data associated with the captured real-time FOV. The audio data may comprise a plurality of signal components. Each of the plurality of signal components may be associated with a signal frequency, a signal amplitude, a signal phase, and/or a signal modulation rate, performed over one or more time intervals.

In accordance with an embodiment, the user 110 may provide one or more preferences for the video content, via the UI rendered on the display screen 108. In accordance with an embodiment, the one or more preferences may comprise a timestamp and/or clip-duration of a video clip from the video content. In accordance with an embodiment, the video content may be pre-stored in the memory 206. In accordance with an embodiment, the video content may be received from the multimedia server 104.

In accordance with an embodiment, the user 110 may select an SOI from a plurality of SOIs displayed on the UI. The plurality of SOIs may correspond to the captured, real-time FOV, the video data of the recorded video content pre-stored in the memory 206, and/or the video data of the video content received from the multimedia server 104. The processor 202 may be operable to identify the SOI, based on the selection performed by the user 110. In accordance with an embodiment, the user 110 may select the SOI when the FOV is captured in real time by the optical components of the electronic device 102. In accordance with an embodiment, the user 110 may select the SOI when the FOV is recorded in real time by the processor 202 and the audio controller 204 of the electronic device 102. In accordance with an embodiment, the user 110 may select the SOI when the recorded FOV or the video content is played back by the processor 202, in conjunction with the audio controller 204.

The selection of the SOI may be performed via one or more parameters provided by the user 110. The one or more parameters may comprise a touch input that may be provided by the user 110 to select the SOI. The touch input may be provided by the user 110, via the display screen 108. The one or more parameters may further comprise a selection of a waveform presented at the display screen 108. The waveform may correspond to an audio portion that may be associated with the SOI to which the user 110 desires to listen. The one or more parameters may further comprise a button-press event performed by the user 110. The button-press event may be performed when the audio portion for the desired SOI is recorded. The one or more parameters may further comprise a gaze direction associated with the eye-movement of the user 110. The one or more parameters may further comprise an automatic selection of the SOI based on previously stored spatio-temporal signature of the SOI.

In accordance with an embodiment, the audio controller 204 may be operable to determine an audio portion associated with the identified SOI. In accordance with an embodiment, the audio controller 204 may be operable to determine the spatio-temporal audio pattern of the SOI, based on a button-press event. The button-press event may be performed by the user 110 for the time duration when the SOI generates an audio portion.

In accordance with a first exemplary scenario, the video data may correspond to a real-time FOV of a live chat-show, captured by the electronic device 102 (such as a video camera). The user 110, associated with the electronic device 102, may perform a touch gesture on the captured, real-time FOV to select a speaker. The processor 202 may be operable to identify the SOI based on the selection performed by the user 110. The processor 202 may be operable to analyze the video data to determine the pattern of lip-movements of the speaker. The processor 202 may be further operable to analyze the video data to determine the movement of the speaker in the captured real-time FOV. Based on the analysis, the audio controller 204, in conjunction with the processor 202, may be operable to determine the spatio-temporal audio pattern of the identified speaker. Based on the determined spatio-temporal audio pattern of the identified speaker, the audio controller 204 may be operable to determine the audio portion of the identified speaker.

In accordance with a second exemplary scenario, a plurality of speakers may output audio at about the same time. The processor 202 may be operable to identify a desired speaker from the plurality of speakers based on the selection performed by the user 110. The processor 202 may be operable to analyze the video data to determine the pattern of lip-movements of each speaker. The processor 202 may be further operable to analyze the video data to determine the movement of each speaker in the captured, real-time FOV. Based on the analysis, the audio controller 204, in conjunction with the processor 202, may be operable to determine audio portions associated with each speaker, based on one or more signal-processing algorithms known in the art. Such one or more signal-processing algorithms may be retrieved from the memory 206.

In accordance with the first and the second exemplary scenario, the audio controller 204 may be further operable to estimate the direction of the speaker by use of an array of microphones in the I/O unit 208. In such a case, the array of microphones may comprise a pre-determined number of microphones, arranged in a pre-determined pattern with a pre-determined spacing between them. The audio controller 204 may be operable to perform beamforming audio processing by use of one or more beamforming algorithms retrieved from the memory 206.

In accordance with an embodiment, the audio controller 204 may be operable to perform audio data decomposition into the plurality of signal components. The audio data decomposition may be based on one of a signal frequency, signal amplitude, a signal phase, and/or a signal modulation rate, performed over one or more time intervals. In accordance with an embodiment, the audio controller 204 may be operable to extract a set of signal components from the plurality of signal components based on a threshold value. In accordance with an exemplary scenario, the audio portion of the identified SOI may be associated with an SNR ratio. The SNR ratio of the audio portion of the identified SOI may be higher than a threshold value that may correspond to a minimum acceptable SNR ratio. In accordance with another exemplary scenario, the audio portion of the identified SOI may correspond to an associated signal frequency. The signal frequency of the audio portion of the identified SOI may be greater than a pre-determined resolution value. In accordance with an embodiment, the threshold value may be manually provided by the user 110, as one of the one or more user preferences. In accordance with an embodiment, the threshold value may be automatically determined by the processor 202, based on the hardware configuration of the electronic device 102.

In accordance with an embodiment, the audio controller 204 may be operable to determine one or more groups of signal components from the extracted set of signal components, based on a coherency factor. The coherency factor may correspond to a degree of similarity of the two or more signal components from the extracted set of signal components. Each determined group of signal components may correspond to an audio portion of corresponding SOI in the audio data.

In accordance with an embodiment, the audio controller 204 may be operable to perform signal separation to select a group of signal components from the one or more groups of signal components. The signal separation may be performed based on one or more criteria. The one or more criteria may comprise one or more of a signal strength, a signal direction, hardware configuration of the electronic device, and/or one or more user preferences. The selected group of signal components may correspond to the audio portion of the identified SOI. In accordance with an embodiment, the audio controller 204 may be operable to reconstitute the signal components from the selected group of signal components to determine the audio portion that corresponds to the identified SOI.

In accordance with an embodiment, the audio controller 204 may be operable to selectively enhance the audio portion of the identified SOI, when the FOV is captured in real time, the captured real-time FOV is recorded, and/or the recorded video content is played back. In accordance with an embodiment, the audio controller 204 may be operable to suppress the other audio portions of the remaining SOIs. Suppression of other audio portions may occur when the FOV is captured in real time, the captured real-time FOV is recorded, and/or the recorded video content is played back. In accordance with an embodiment, the audio controller 204 may be operable to enhance the audio portion of the SOI and suppress the other audio portions of the remaining SOIs, when the FOV is captured in real time, the captured real-time FOV is recorded, and/or the recorded video content is played back.

In accordance with an embodiment, the user 110 may select another SOI from the video data, via the display screen 108, when the video content is played back. The selection may be performed via the one or more parameters. Based on the selection, the electronic device 102 may be operable to identify the other SOI. In accordance with an embodiment, the audio controller 204 may be operable to determine another audio portion that corresponds to the other identified SOI. In accordance with an embodiment, the audio controller 204 may be operable to selectively enhance the determined other audio portion when the video data is received, recorded, and/or played back. In accordance with an embodiment, the audio controller 204 may be operable to suppress the other audio portions of the remaining SOIs when the other SOI is identified. In accordance with an embodiment, the audio controller 204 may be operable to enhance the other audio portion of the other identified SOI and suppress the rest of the audio portions that correspond to the remaining SOIs.

Figure 3A:
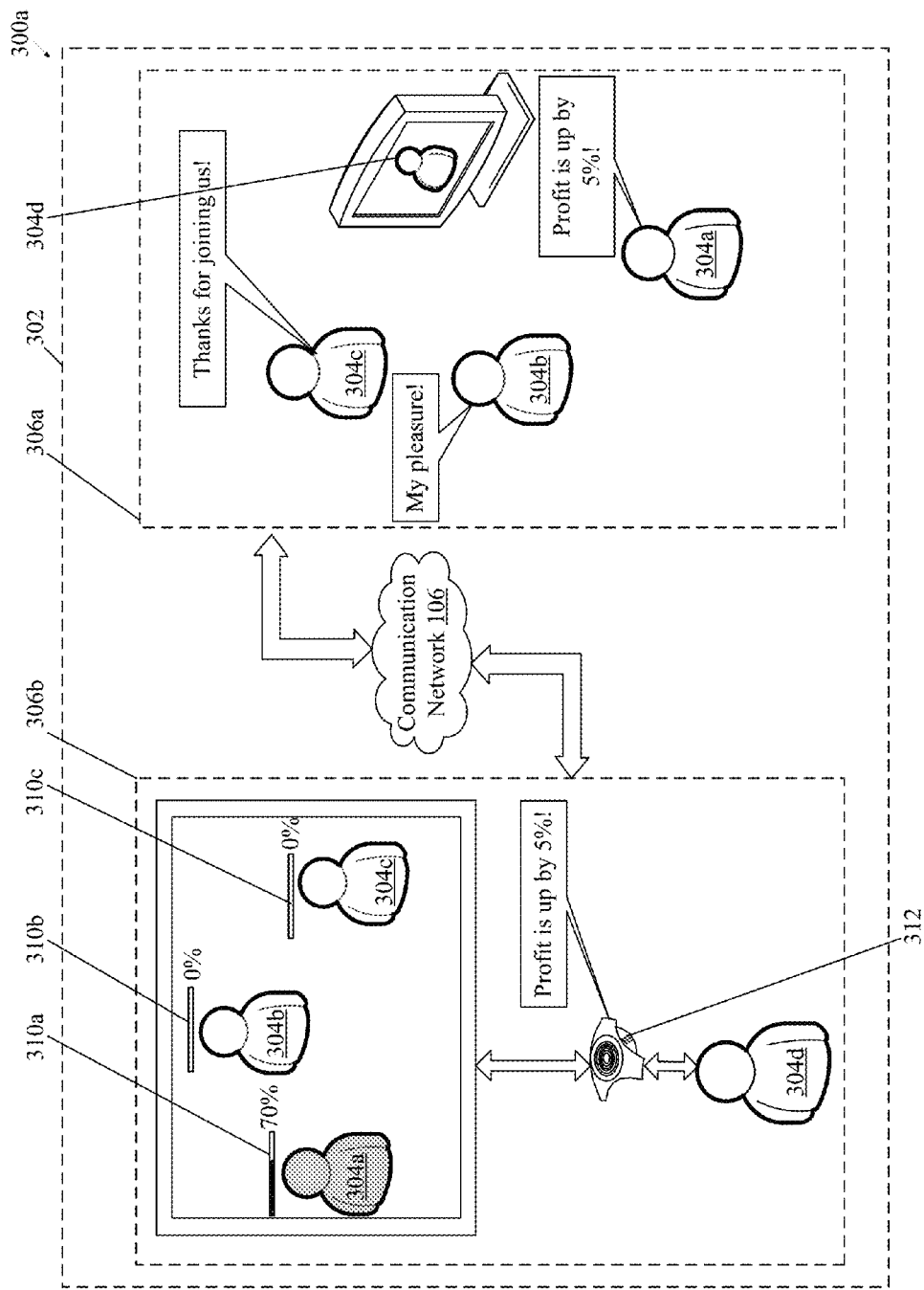
FIG. 3A illustrates an exemplary scenario to process audio data of video content, in accordance with an embodiment of the disclosure.

FIG. 3A illustrates an exemplary scenario to process audio data of video content, in accordance with an embodiment of the disclosure. FIG. 3A is explained in conjunction with elements from FIG. 1 and FIG. 2. With reference to FIG. 3A, there is shown an exemplary scenario 300a. With reference to the exemplary scenario 300a, there is shown an event 302, such as a video conference. The event 302 may include a first environment 306a and a second environment 306b communicatively coupled with each other, via the communication network 106. The event 302 may include a plurality of participants 304, such as a first participant 304a, a second participant 304b, a third participant 304c, and a fourth participant 304d. The first participant 304a, the second participant 304b, and the third participant 304c may be associated with a first electronic device in the first environment 306a. The fourth participant 304d may be associated with a second electronic device in the second environment 306b.

In accordance with the exemplary scenario 300a, the second electronic device may correspond to the electronic device 102, as shown in FIG. 1. The second electronic device may further comprise a processor 308a, an audio controller 308b, and a memory 308c, that are not shown in FIG. 3A for simplicity. The functionality of the processor 308a, the audio controller 308b, and the memory 308c, may be similar to the functionality of the processor 202, the audio controller 204, and the memory 306 (as shown in FIG. 2), respectively. With reference to FIG. 3A, there is further shown a plurality of UI elements, such as a first slider 310a, a second slider 310b, and a third slider 310c, at the second electronic device in the second environment 306b. The plurality of UI elements, presented as sliders, may be operable to control audio portions of the corresponding SOIs. For example, the first slider 310a may be operable to control an audio portion of the first participant 304a, the second slider 310b may be operable to control an audio portion of the second participant 304b, and the third slider 310c may be operable to control an audio portion of the third participant 304c. There is further shown a speaker 312 that may play the audio portion of one of the first participant 304a, the second participant 304b, and the third participant 304c, based on a selection of SOI performed by the fourth participant 304d.

In operation, the fourth participant 304d may interact with the first participant 304a, the second participant 304b, and the third participant 304c, via the display screen of the second electronic device. The first environment 306a of the first participant 304a, the second participant 304b, and the third participant 304c, may include one or more sources of ambient noise. The ambient noise may correspond to a sound generated by a projector installed in the first environment 306a.

In accordance with the exemplary scenario 300a, the video content that corresponds to the video conference, may be received by the second electronic device associated with the fourth participant 304d. The video content may comprise video data and audio data. The video data may correspond to a sequence of frames that comprises the first participant 304a, the second participant 304b, and the third participant 304c. The sequence of frames may be rendered at the UI of the second electronic device. The audio data may comprise a first audio portion, a second audio portion, and a third audio portion. The first audio portion may correspond to the first participant 304a, the second audio portion may correspond to the second participant 304b, and the third audio portion may correspond to the third participant 304c.

In accordance with the exemplary scenario 300a, the first participant 304a, the second participant 304b, and the third participant 304c, may speak at the same time. For example, the first audio portion may be a first dialogue, "Profit is up by 5%!", the second audio portion may be a second dialogue, "My pleasure", and the third audio portion may be a third dialogue, "Thanks for joining us!", spoken at the same time. Thus, the first audio portion, the second audio portion and the third audio portion may be received at the second electronic device, in an overlapped manner. However, the fourth participant 304d may be interested to listen to only the first participant 304a. In such a case, the fourth participant 304d may select the first participant 304a as an SOI. Such a selection may highlight the first participant 304a. The selection may be performed based on a touch-based input on the display screen of the second electronic device. The processor 308a may be operable to identify the first participant 304a as the SOI, based on the selection performed by the fourth participant 304d. The audio controller 308b may be operable to analyze the audio data that corresponds to the video data displayed at the display screen of the second electronic device. Based on the analysis, the audio controller 308b may be operable to selectively enhance audio portion of the identified SOI (the first participant 304a). The analysis performed by the audio controller 308b may comprise audio data decomposition and extraction, signal component categorization, signal component separation, and signal component reconstitution. Accordingly, the first audio portion, such as the first dialogue spoken by the first participant 304a, may only be outputted via the speaker 312. The second and the third audio portions may be suppressed and thus, not outputted via the speaker 312. The fourth participant 304d may control the enhancement and in turn, the volume level of the first audio portion by use of the first slider 310a. The audio data decomposition and extraction, the signal component categorization, the signal component separation, and signal component reconstitution may be described in the subsequent FIGS. 3B, 3C, 3D, and 3E, respectively.

Figure 3B:
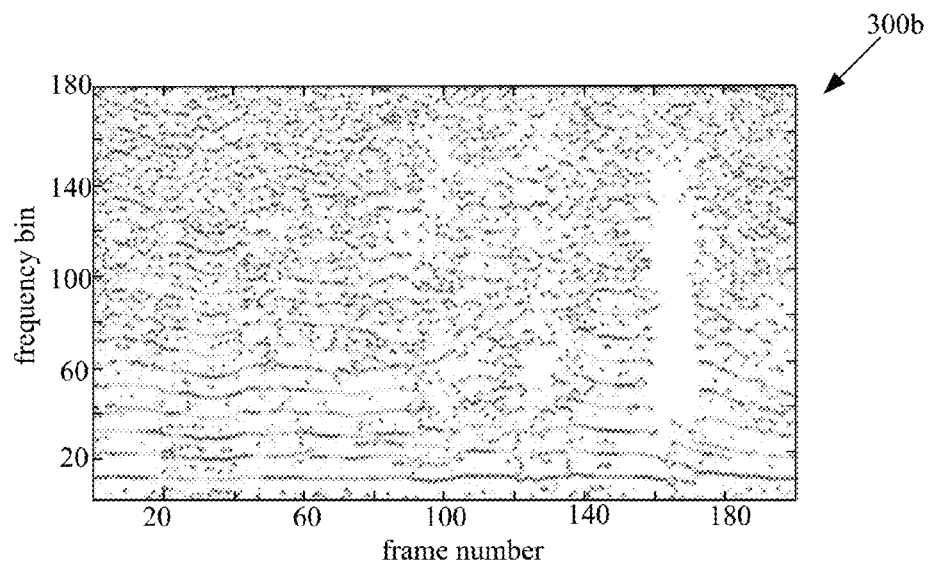
FIG. 3B is a graphical representation that illustrates audio data decomposition and signal extraction, in accordance with an embodiment of the disclosure.

FIG. 3B is a graphical representation that illustrates audio data decomposition and extraction, in accordance with an embodiment of the disclosure. With reference to FIG. 3B, there is shown a graphical representation 300b that is described in conjunction with FIGS. 1, 2, and 3A. The graphical representation 300b may include an x-axis that may represent frame number from a sequence of audio frames. The graphical representation 300b may further include a y-axis that may represent a frequency bin of the audio data.

With reference to FIG. 3B, the audio controller 308b may be operable to perform audio data decomposition into a plurality of signal components based on a signal frequency. Notwithstanding, the disclosure may not be so limited, and the audio data decomposition may be based on other signal characteristics, such as signal amplitude, a signal phase, and/or a signal modulation rate, without deviating from the scope of the disclosure.

The plurality of signal components of the decomposed audio data may be plotted in the graphical representation 300b. With reference to FIG. 3A, the audio data may be a combination of audio portions generated by different SOIs and/or audio sources. For example, the audio data includes three audio portions that correspond to the plurality of participants 304 in the first environment 306a. The audio data may further include ambient noise generated by the projector installed in the first environment 306a. Thus, different audio portions of the audio data may be associated with different ranges of the associated signal components. Consequently, the graphical representation 300b of the plurality of signal components may be plotted in different colors. For example, the signal components of the first audio portion and the second audio portion may be plotted in a blue color and a red color, respectively. Further, the signal frequencies of the third audio portion and the ambient noise may be plotted in a green color and a black color, respectively.

In accordance with an embodiment, the audio controller 308b may be operable to extract a set of signal components from the plurality of signal components, based on a threshold value. The threshold value may correspond to the type of the signal component. For example, with reference to FIG. 3B, the threshold value may be a pre-determined resolution value of the frequency bin. In accordance with an embodiment, the threshold value may be manually provided by the fourth participant 304d as one of the one or more user preferences. In accordance with an embodiment, the threshold value may be automatically determined by the processor 308a, based on the hardware configuration of the second electronic device.

Figure 3C:
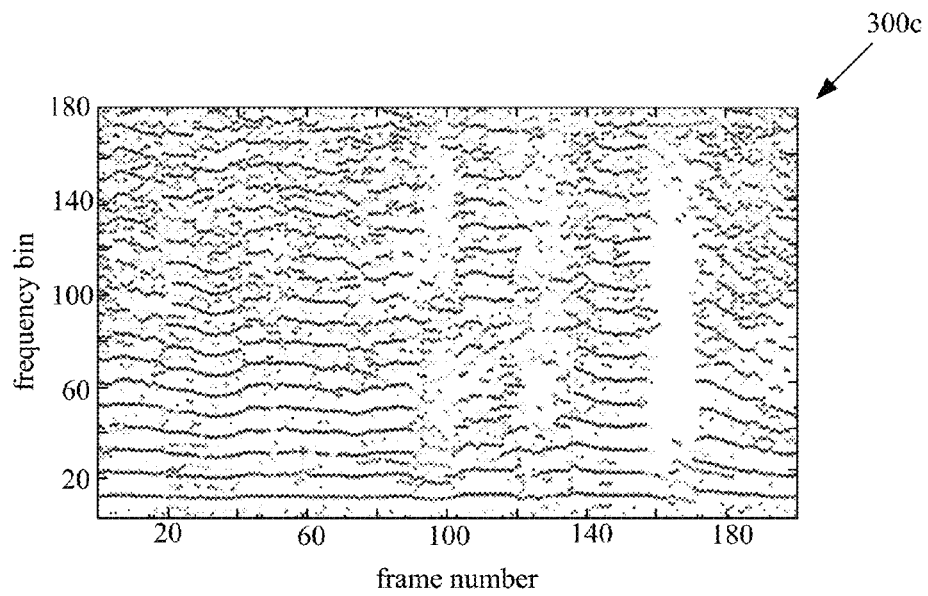
FIG. 3C is a graphical representation that illustrates signal categorization, in accordance with an embodiment of the disclosure.

FIG. 3C is a graphical representation that illustrates signal categorization, in accordance with an embodiment of the disclosure. With reference to FIG. 3C, there is shown a graphical representation 300c that is described in conjunction with FIGS. 1, 2, 3A, and 3B. The graphical representation 300c may include an x-axis that may represent frame number from the sequence of frames. The graphical representation 300c may further include a y-axis that may represent a frequency bin of the audio data.

With reference to FIG. 3C, the audio controller 308b may be operable to determine one or more groups of signal components from the extracted set of signal components. The one or more groups of signal components may be determined based on a coherency factor. The coherency factor may correspond to a degree of similarity of the two or more signal components from the extracted set of signal components. Each group from the one or more groups may correspond to a related audio portion in the audio data.

Figure 3D:
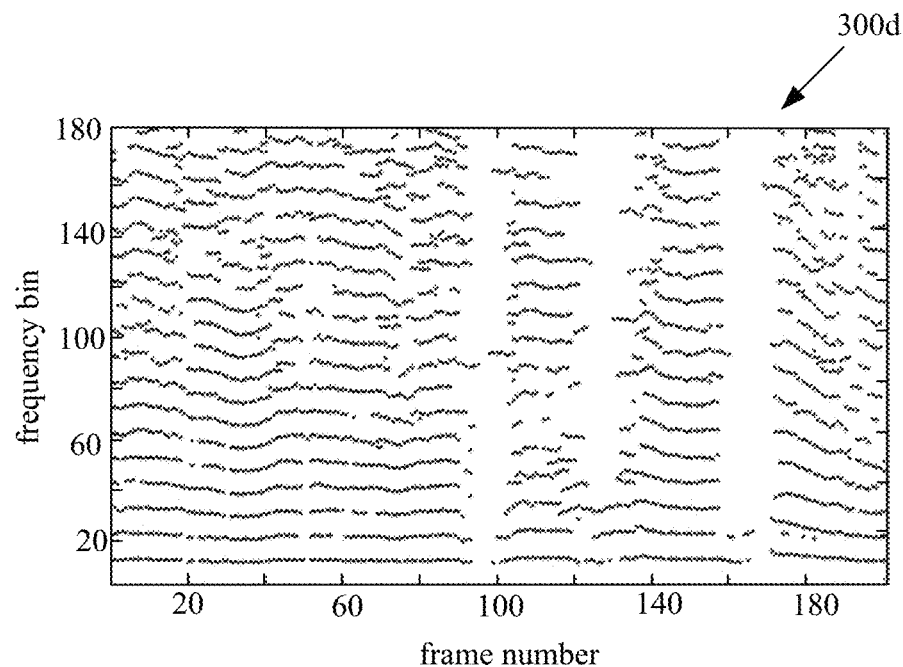
FIG. 3D is a graphical representation that illustrates signal separation, in accordance with an embodiment of the disclosure.

FIG. 3D is a graphical representation that illustrates signal separation, in accordance with an embodiment of the disclosure. With reference to FIG. 3D, there is shown a graphical representation 300d that is described in conjunction with FIGS. 1, 2, 3A, 3B, and 3C. The graphical representation 300d may include an x-axis that may represent frame number from the sequence of audio frames. The graphical representation 300b may further include a y-axis that may represent a frequency bin of the audio data.

With reference to FIG. 3D, the audio controller 308b may be operable to perform signal separation to select a group of signal components from the determined one or more groups of signal components based on one or more criteria. The selected group of signal components, represented by the black color dots, may correspond to the first participant 304a. The one or more criteria may include one or more of signal strength of the first audio portion of the first participant 304a, a signal direction of the first audio portion of the first participant 304a, hardware configuration of the second electronic device, and/or one or more user preferences. The one or more user preferences may include manual selection of desired audio portion that the fourth participant may desire to enhance.

Figure 3E:
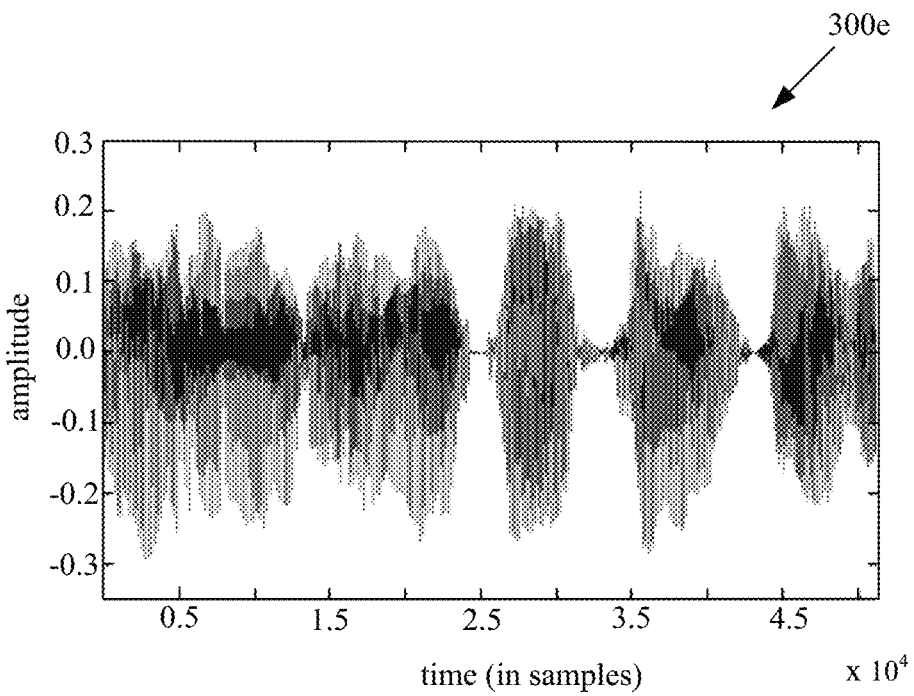
FIG. 3E is a graphical representation that illustrates signal reconstitution, in accordance with an embodiment of the disclosure.

FIG. 3E is a graphical representation that illustrates signal reconstitution, in accordance with an embodiment of the disclosure. With reference to FIG. 3E, there is shown a graphical representation 300e that is described in conjunction with FIGS. 1, 2, 3A, 3B, 3C, and 3D. The graphical representation 300e may include an x-axis that may represent time in terms of samples. The graphical representation 300e may further include a y-axis that may represent amplitude of the audio data.

With reference to FIG. 3E, the audio controller 308b may be operable to reconstitute the selected group of signal components. The reconstitution may determine the audio portion that corresponds to the identified SOI, such as the first participant 304a. In accordance with an exemplary scenario, the selected group of signal components may be reconstituted in a time domain. Notwithstanding, the disclosure may not be so limited, and the reconstitution may be performed based on one or more mechanisms known in the art, without deviating from the scope of the disclosure.

Figure 3F:
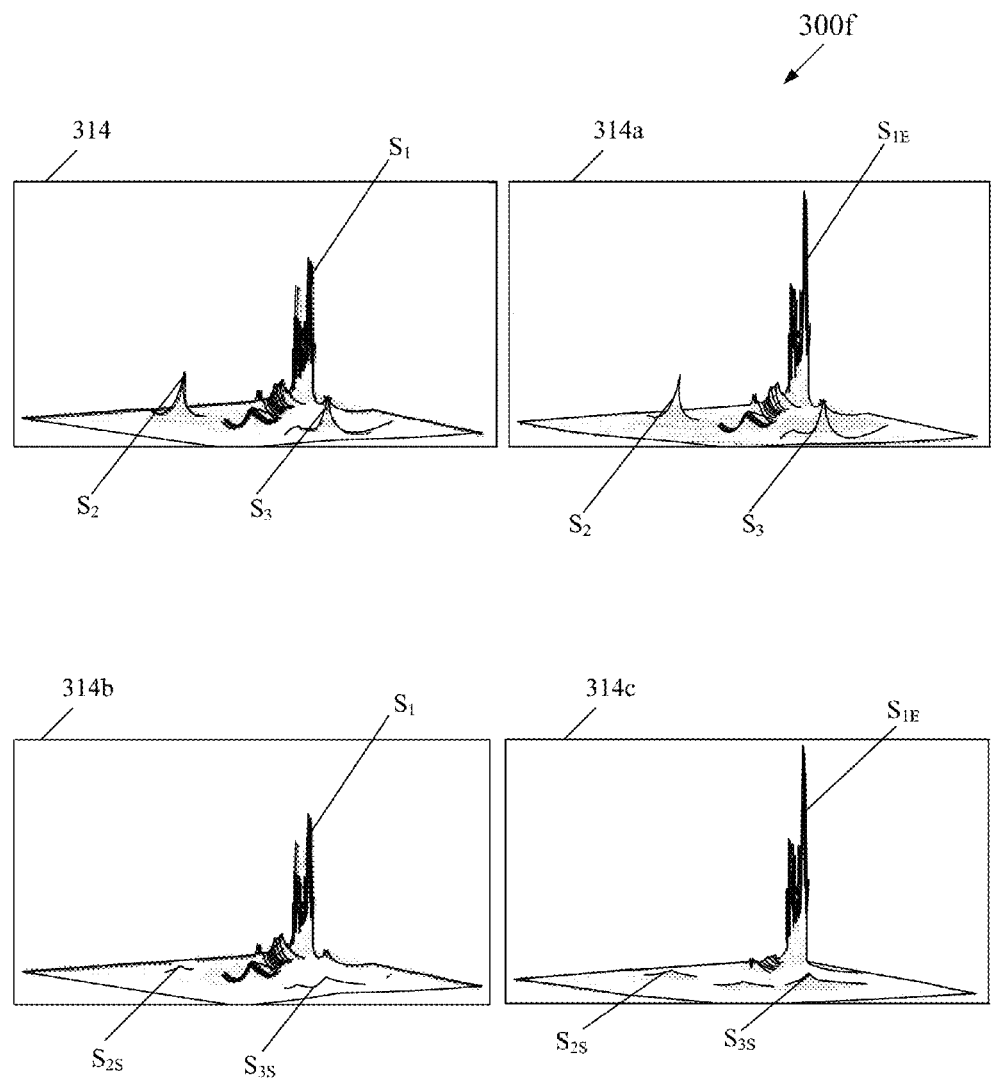
FIG. 3F is a graphical representation that illustrates selective enhancement of an audio portion, in accordance with an embodiment of the disclosure.

FIG. 3F is a graphical representation that illustrates selective enhancement of an audio portion, in accordance with an embodiment of the disclosure. With reference to FIG. 3F, there is shown the exemplary scenario 300f that is described in conjunction with FIGS. 1, 2, 3A, 3B, 3C, 3D, and 3E. The exemplary scenario 300f is derived from the exemplary scenario 300a and subsequent analysis performed by the audio controller 308b, when the processor 308a identifies the SOI (the first participant 304a). The analysis performed by the audio controller 308b may comprise the audio data decomposition and extraction (as shown in FIG. 3B), signal component categorization (as shown in FIG. 3C), signal component separation (as shown in FIG. 3D), and signal component reconstitution (as shown in FIG. 3E). With reference to FIG. 3E, there is shown a three-dimensional (3-D) vector representation 314 of analyzed audio signals. The 3-D vector representation 314 of analyzed audio signals may comprise a set of signal components that may correspond to various SOIs in the audio data. There is further shown other three-dimensional (3-D) vector representations, such as 314a, 314b, and 314c, in accordance with various embodiments, as described hereinafter.

With reference to FIG. 3F, the audio controller 308b may be operable to reconstitute the selected group of signal components, which correspond to the identified SOI, in the time domain. The 3-D vector representation 314 of the analyzed audio signals may comprise a first set of signal components, "$S_1$", that may correspond to an identified SOI, such as the first participant 304a. The 3-D vector representation 314 may further comprise a second set and a third set of signal components, "$S_2$" and "$S_3$", that may correspond to other SOIs, such as the second participant 304b and the third participant 304c, respectively.

In accordance with an embodiment, the audio controller 308b may selectively enhance the first set of signal components, "$S_1$", that correspond to the first participant 304a, when reconstituted. Consequently, as illustrated in the other 3-D vector representation 314a, the audio controller 308b may amplify the first set of signal components, "$S_1$", to the enhanced set of signal components, "$S_{1E}$". Such an enhancement of the first set of signal component, "$S_1$", may be based on one or more audio enhancement algorithms. The one or more audio enhancement algorithms may be based on one or more of an audio filtering technique, a spectral restoration method, and/or a model-based method, known in the art.

In accordance with an embodiment, the audio controller 308b may selectively suppress the second set of signal components, "$S_2$", and the third set of signal components, "$S_3$", when reconstituted. Consequently, as illustrated in the other 3-D vector representation 314b, the audio controller 308b may reduce the amplitude of the second set of signal components, "$S_2$", and the third set of signal components, "$S_3$", to the suppressed set of signal components, "$S_{2S}$" and "$S_{3s}$". Such a suppression of the other signal components may be based on one or more noise suppression algorithms. The one or more noise suppression algorithms may be based on one or more of a spectral subtraction technique, Wiener filtering technique, and/or the like.

In accordance with an embodiment, the audio controller 308b may simultaneously perform selective enhancement and suppression of the various sets of signal components, when reconstituted. For example, as illustrated in the other 3-D vector representation 314c, the audio controller 308b may selectively enhance the first set of signal components, "$S_1$", to the enhanced first set of signal components, "$S_{1E}$". Simultaneously, the audio controller 308b may reduce the amplitude of the second set of signal components, "$S_2$", and the third set of signal components, "$S_3$", to the suppressed second set and third set of signal components, "$S_{2S}$" and "$S_{3s}$".

In accordance with an embodiment, the audio data may comprise mono-sound signals. In such a case, the signal components are reconstituted in only one channel. In accordance with an embodiment, the audio data may comprise stereo-sound signals. In such a case, the signal components are reconstituted in two channels, such as a left channel and a right channel.

Figure 4:
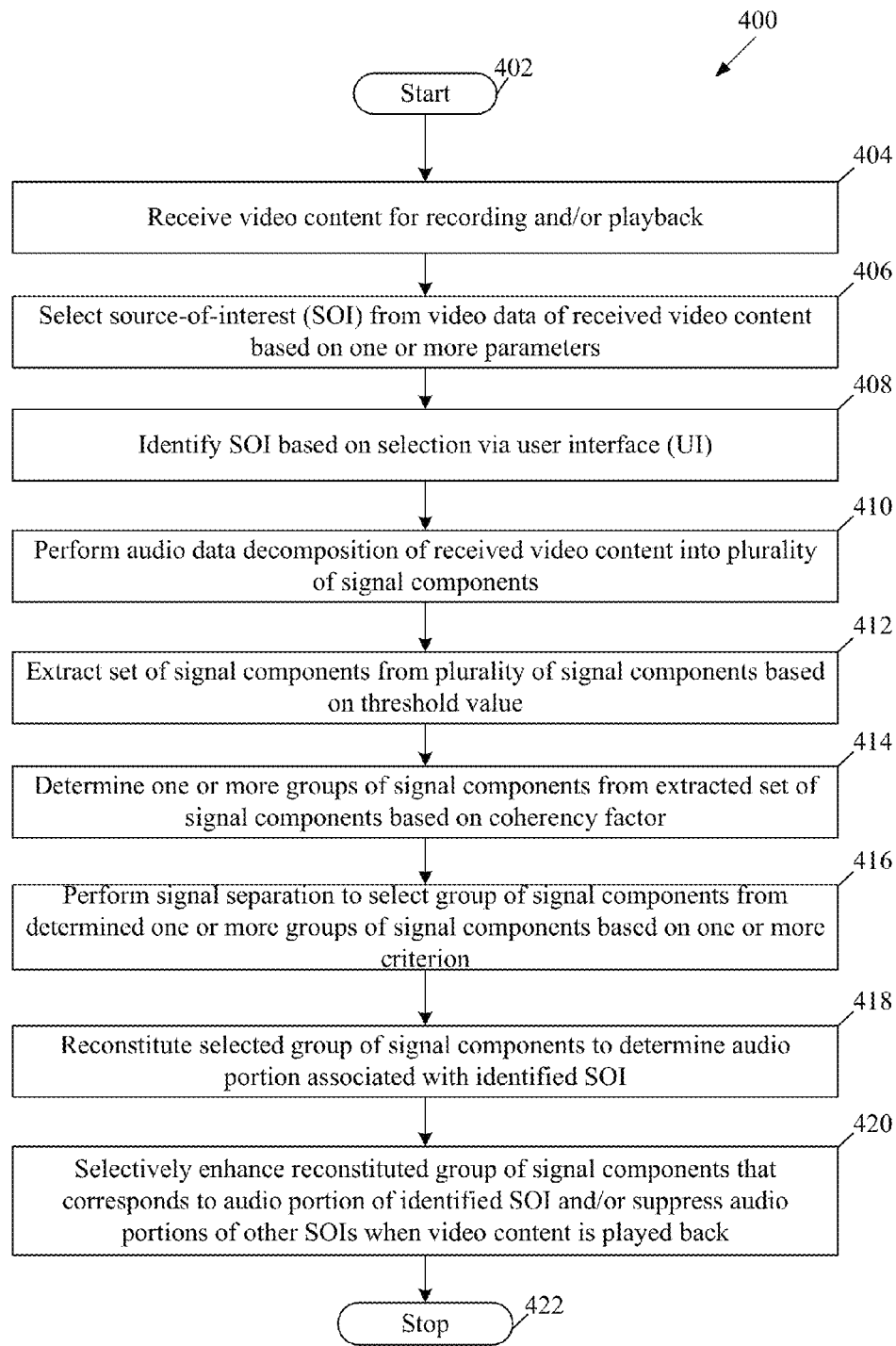
FIG. 4 is a flow chart that illustrates a method to process audio data of video content, in accordance with an embodiment of the disclosure.

FIG. 4 is a flow chart that illustrates a method to process audio data of video content, in accordance with an embodiment of the disclosure. With reference to FIG. 4, there is shown a flow chart 400 that is described in conjunction with FIGS. 1 to 3F. The method starts at step 402 and proceeds to step 404.

At step 404, video content may be received for play back. At step 406, the user 110 may select a source-of-interest (SOI) from the video data of the received video content based on one or more parameters. At step 408, the SOI may be identified based on the selection via a user interface (UI), when the video content is played back.

At step 410, audio data decomposition into a plurality of signal components may be performed. The audio data decomposition may be performed based on one of a signal frequency, signal amplitude, a signal phase, and/or a signal modulation rate, performed over one or more time intervals. At step 412, a set of signal components may be extracted from the plurality of signal components based on a threshold value. At step 414, one or more groups may be determined from the extracted set of signal components based on a coherency factor. Each determined group may correspond to an audio portion in the audio data. At step 416, signal separation on the determined one or more groups may be performed to select a group of signal components based on the one or more criteria. The one or more criteria may comprise one or more of signal strength, a signal direction, hardware configuration of the electronic device, and/or one or more user preferences. The selected group of signal components may correspond to the audio portion of the identified SOI. At step 418, the selected group of signal components may be reconstituted to determine an audio portion that corresponds to the identified SOI.

At step 420, the audio portion of the identified SOI may be selectively enhanced when the video content is played back. In accordance with an embodiment, audio portions of other SOIs may be suppressed when the audio portion of the identified SOI is selectively enhanced. Control passes to end step 422.

In accordance with an embodiment of the disclosure, the system to process audio data of video content may comprise the electronic device 102 (FIG. 1). The electronic device 102 may comprise one or more circuits and/or processors, such as the processor 202 and the audio controller 204 (FIG. 1), operable to identify an SOI when video content is played back. The SOI may be identified based on one or more parameters. The audio controller 204 may selectively enhance an audio portion of the identified SOI when the video content is played back.

Various embodiments of the disclosure may provide a non-transitory computer readable medium and/or storage medium, and/or a non-transitory machine readable medium and/or storage medium having stored thereon, a machine code and/or a computer program with at least one code section executable by a machine and/or a computer that processes audio data of video content. The at least one code section may cause the machine and/or computer to perform the steps that comprise identification of a source-of-interest (SOI) when video content is played back. The SOI may be identified based on one or more parameters. An audio portion of the identified SOI may be selectively enhanced when the video content is played back.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for processing audio data of video content, said method comprising:

in an electronic device:
identifying a source-of-interest (SOI) during a playback of said video content, wherein said SOI is identified based on one or more parameters; and
selectively enhancing an audio portion of said identified SOI during said playback of said video content, wherein said audio portion of said identified SOI corresponds to a signal-to-noise (SNR) ratio, wherein said SNR ratio is higher than a pre-determined threshold value.

2. The method of claim 1, further comprising receiving said audio data of said video content via one or more microphones, wherein
said audio data comprises said audio portion of said identified SOI and background audio portion.

3. The method of claim 2, wherein
said background audio portion comprises ambient noise and other audio portions of remaining SOIs.

4. The method of claim 2, further comprising suppressing said background audio portion of said audio data when said audio portion of said identified SOI is selectively enhanced.

5. The method of claim 2, further comprising performing audio data decomposition of said audio data into a plurality of signal components based on one or more of a signal frequency, a signal amplitude, a signal phase, and/or a signal modulation rate performed over one or more time intervals.

6. The method of claim 5, further comprising extracting a set of signal components from said plurality of signal components based on a threshold value.

7. The method of claim 6, further comprising determining one or more groups of signal components from said extracted said set of signal components based on a coherency factor.

8. The method of claim 7, further comprising performing signal separation to select a group of signal components, which corresponds to said identified SOI, from said determined one or more groups of signal components based on one or more criteria.

9. The method of claim 8, further comprising reconstituting said selected group of signal components to determine said audio portion associated with said identified SOI.

10. The method of claim 8, wherein
said one or more criteria comprise one or more of: a signal strength of said audio portion of said identified SOI, a signal direction of said audio portion of said identified SOI, hardware configuration of said electronic device, and/or one or more user preferences.

11. The method of claim 1, wherein
one or more parameters correspond to one or more at selection of said SOI based on a touch input on said SOI displayed on a display screen that displays said video content, selection of a displayed waveform that corresponds to said audio portion of said SOI, a button-press event performed when said audio portion is to be recorded for said SOI, selection of said SOI based on tracking eye movements of a user, and/or an automatic selection of said SOI based on previously stored spatio-temporal signature of said SOI.

12. The method of claim 1, wherein
said selective enhancement of said audio portion of said identified SOI is direction independent.

13. The method of claim 1, further comprising identifying another SOI, via a user interface, during said playback of said video content based on said one or more parameters.

14. The method of claim 1, further comprising selectively enhancing another audio portion of said identified another SOI during said playback of said video content.

15. The method of claim 1, further comprising selectively enhancing said audio portion of said identified SOI when said video content is received and/or recorded.

16. The method of claim 15, further comprising estimating a correlation of said audio portion from said audio data associated with said video content and said identified SOI based on a spatio-temporal audio pattern matching technique.

17. A system for processing audio data at video content, said system comprising:

one or more circuits in an electronic device being operable to:
identity a source-of-interest (SOI) during a playback of said video content, wherein said SOI is identified based on one or more parameters; and
selectively enhance an audio portion of said identified SOI during said playback of said video content, wherein said audio portion of said identified SOI corresponds to a signal-to-noise (SNR) ratio, wherein said SNR ratio is higher than a pre-determined threshold value.

18. The system of claim 17, wherein
said one or more circuits are further operable to suppress background audio portion of said audio data when said audio portion of said identified SOI is selectively enhanced.

19. The system of claim 17, wherein
said one or more circuits are further operable to receive said audio data of said video content via one or more microphones, wherein said audio data comprises said audio portion of said identified SOI and background audio portion.

20. A method of processing audio data of video content, said method comprising:

in an electronic device:
identifying a source-of-interest (SOI) during a playback of said video content, wherein said SOI is identified based on one or more parameters;
estimating a correlation of an audio portion from said audio data associated with said video content and said identified SOI based on a spatio-temporal audio pattern matching technique; and
selectively enhancing the audio portion of said identified SOI during said playback of said video content.

* * * * *